Patented Sept. 27, 1949

2,483,372

UNITED STATES PATENT OFFICE 2,483,372

HEAVY GRAVITY LIQUID SEPARATION OF POROUS CATALYST

John W. Payne, Woodbury, N. J., assignor to Socony-Vacuum Oil Company, Incorporated, a corporation of New York No Drawing. Application October 29, 1947, Serial No. 782,947

1 Claim. (Cl. 209—172)

This invention relates to a process for classification of porous solids on a basis of particle density. A preferred embodiment contemplates separation of porous cracking catalyst on that basis to achieve a separation between catalyst particles of different catalytic activity.

The density values referred to herein are to be distinguished from specific gravity. It is convenient to afford a reasonable expression of porosity of porous solids by comparison of compacted apparent density and particle density which values both express weight per unit of volume including void spaces. Particle density represents the weight of a particle of porous solid including the weight of air in the pores per unit of volume occupied by the particle. Compacted apparent density is the weight per unit of volume of a mass of particles which have been vibrated, tapped or the like to cause them to settle compactly in a container.

The properties of many porous solids for specialized purposes vary with pore volume, pore diameter and surface area available for contact with gases and liquids. These values are determinable. The variations in these values are reflected in particle density and compacted apparent density for obvious reasons.

The invention is applicable to porous solids in general, for example silica gel dessicants, zeolites, porous metals such as those formed by electroplating at excessive voltage and many others. A typical embodiment is concerned with catalysts for the cracking of hydrocarbons to form high quality gasoline. These are generally porous composites of silica and alumina of either natural or synthetic origin. The natural catalysts are activated clays, while the synthetic catalysts are prepared by joint precipitation or gelation of silica and alumina or incorporation of alumina in a silica gel or precipitate.

Both types of cracking catalysts are impaired as to cracking activity by excessive temperatures. In general, temperatures above about 1425° F. adversely affect clay catalyst. The synthetic catalysts do not suffer accelerated decline in activity at temperatures below about 1650° F. The decrease in activity of these catalysts, due either to gradual impairment in use or rapid deactivation by excessive temperatures, is accompanied by increases in compacted apparent density and particle density. In actual use, it is possible to have catalyst particles of varying activity in the large mass of catalyst particles in use. Two factors influence this differential. A portion of the catalyst may be subjected to excessive temperatures due to a portion of the cracking plant being temporarily out of control. Additionally, the continuous addition of catalyst make-up results in addition of fresh, highly active catalyst to partially deactivated catalyst.

The invention is not limited to treatment of catalyst, or other porous solid, which has been altered by use. In the initial manufacture or activation of catalysts, dessicants and the like, unbalanced conditions will result in a product which is not of uniform quality. This may be classified by the method of the present invention.

Briefly stated, the invention contemplates soaking a mass of porous solid particles of varying particle density in a liquid to thereby fill the pores with the soaking liquid. The mass is then placed in a body of a flotation liquid immiscible with the soaking liquid and having a specific gravity intermediate the maximum and minimum particle densities of the soaked particles. Depending on whether the soaking liquid has a specific gravity greater or less than that of the porous solid, the particles having greater or lesser pore volume will sink while the remainder will float. Preferably the liquid is agitated to permit all heavy particles to sink. The floating portion and the sunken portion are then separately removed, washed if necessary and the soaking liquid is removed, as by evaporation.

In a typical operation, the process was used to classify pelleted clay catalyst withdrawn from a continuous catalytic cracking plant of the compact moving bed type. The sample as withdrawn had a compacted apparent density of 0.85 gram per c. c. and an activity index of 25.9 by the Cat-A method as described by Alexander and Shimp, National Petroleum News, vol. 36, page P.R.-537 (August 2, 1944).

Example I

A portion of the sample described above was soaked for about ten minutes in Stoddard solvent having an A. P. I. gravity of 49 and a boiling range of 305 to 395° F. The soaked clay pellets were daded to aqueous sulfuric acid containing 78 per cent $H_2SO_4$ by weight. The mixture was stirred for about ½ minute to facilitate separation and the floating particles were then skimmed off. The acid was drained from the heavier pellets and the two portions of pellets were water washed at about 180° F. until the effluent wash water was neutral to litmus. The catalyst portions were then heated to evaporate water and Stoddard solvent and compared.

The lighter portion constituted 61 per cent by weight of the whole on a dry basis. Average particle density was found to be 1.22 g./cc. dry or 1.65 g./cc. while the pores were filled with solvent. This latter figure is equivalent to the specific gravity of 73 per cent sulfuric acid. Compacted apparent density was 0.79. Activity index (Cat-A) of the light portion was found to be 29.6.

The heavier portion showed average particle densities of 1.52, dry, and 1.77, filled with solvent. This latter value corresponds to 85 per cent sulfuric acid. Compacted apparent density was 0.99. Activity Index (Cat-A) was 19.8.

*Example II*

A further portion of the sample was treated in the same manner as in Example I except that the flotation agent was 98 per cent by weight sulfuric acid. Seventy-five per cent of lighter catalyst was obtained having an activity index of 29.8 as against a heavier portion of 14.3 activity index. The latter had an average particle density of 1.63, dry, or 1.92, filled with solvent, corresponding to a specific gravity greater than that of 100 per cent sulfuric acid. Compacted apparent density was 1.06.

I claim:

A process for the flotation separation of porous cracking catalyst particles of substantially identical chemical composition but varying activity which comprises filling the pores of said particles with a liquid hydrocarbon, admixing said hydrocarbon filled particles with an aqueous liquid having a specific gravity numerically intermediate the maximum and minimum values for particle densities of said hydrocarbon filled particles and separately removing the portion of said particles which floats on and the portion thereof which sinks in said liquid.

JOHN W. PAYNE.

REFERENCES CITED

The following references are of record in the file of this patent:

UNITED STATES PATENTS

| Number | Name | Date |
|---|---|---|
| 1,374,657 | Hiller | Apr. 12, 1921 |
| 1,871,121 | Holmes | Aug. 9, 1932 |
| 1,839,117 | Nagelvoort | Dec. 29, 1931 |
| 2,225,459 | Palmrose | Dec. 17, 1940 |
| 2,216,050 | Romberg | Sept. 24, 1940 |
| 2,451,528 | Armstrong | Oct. 19, 1948 |